(12) United States Patent
Uematsu et al.

(10) Patent No.: US 7,837,249 B2
(45) Date of Patent: Nov. 23, 2010

(54) VEHICLE FOR ENHANCING RECOGNITION ACCURACY OF VISUAL INFORMATION

(75) Inventors: Hiroshi Uematsu, Saitama (JP); Isao Uematsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 256 days.

(21) Appl. No.: 11/593,406

(22) Filed: Nov. 6, 2006

(65) Prior Publication Data

US 2007/0102950 A1    May 10, 2007

(30) Foreign Application Priority Data

Nov. 7, 2005    (JP) .............................. 2005-321986

(51) Int. Cl.
 *B60J 1/02*    (2006.01)
 *B60J 3/00*    (2006.01)
(52) U.S. Cl. .................................................. 296/96.19
(58) Field of Classification Search ................ 296/84.1, 296/90, 95.1, 96.19
 See application file for complete search history.

(56) References Cited

U.S. PATENT DOCUMENTS

| 1,156,578 | A | * | 10/1915 | Benecke | 296/96.19 |
| 1,646,743 | A | * | 10/1927 | Bernard | 296/93 |
| 1,773,040 | A | * | 8/1930 | Harden | 296/84.1 |
| 2,187,027 | A | * | 1/1940 | Harvey | 296/97.7 |
| 2,253,766 | A | * | 8/1941 | Crowell | 296/97.7 |
| 3,031,223 | A | * | 4/1962 | Koplin | 296/200 |
| 3,199,114 | A | * | 8/1965 | Malifaud | 351/45 |
| 3,276,813 | A | * | 10/1966 | Shaw, Jr. | 296/96.19 |
| 3,429,006 | A | * | 2/1969 | Conner et al. | 425/383 |
| 4,555,434 | A |   | 11/1985 | Kunert |  |
| 4,818,011 | A | * | 4/1989 | Cherian | 296/97.2 |
| 5,112,675 | A | * | 5/1992 | Wuest et al. | 428/216 |
| 6,536,828 | B2 | * | 3/2003 | Love et al. | 296/96.19 |
| 7,100,960 | B2 | * | 9/2006 | Iwao et al. | 296/84.1 |
| 7,159,924 | B2 | * | 1/2007 | Ito et al. | 296/96.19 |
| 7,284,782 | B2 | * | 10/2007 | Uenuma et al. | 296/84.1 |
| 2004/0239141 | A1 | * | 12/2004 | Iwao et al. | 296/84.1 |
| 2005/0046222 | A1 | * | 3/2005 | Ito et al. | 296/96.19 |
| 2005/0280275 | A1 | * | 12/2005 | Uenuma et al. | 296/84.1 |

FOREIGN PATENT DOCUMENTS

| DE | 10337701 | 3/2005 |
| JP | 06-072151 | 3/1994 |
| JP | 2000-211355 | 8/2000 |
| JP | 2005-014884 | 1/2005 |

OTHER PUBLICATIONS

German Office Action for Application No. 10 2006 052 471.3-24, dated Aug. 5, 2009.
Japanese Office Action for Application No. 2005-321986, dated Nov. 30, 2009.

* cited by examiner

*Primary Examiner*—H Gutman
(74) *Attorney, Agent, or Firm*—Lahive & Cockfield, LLP; Anthony A. Laurentano, Esq.

(57) ABSTRACT

The vehicle is equipped with a front window having a light transmission characteristic and separated into a first area and a second area provided below the first area, wherein a boundary between the first area and the second area is provided so that a looking-down angle from a driver is constant.

21 Claims, 12 Drawing Sheets

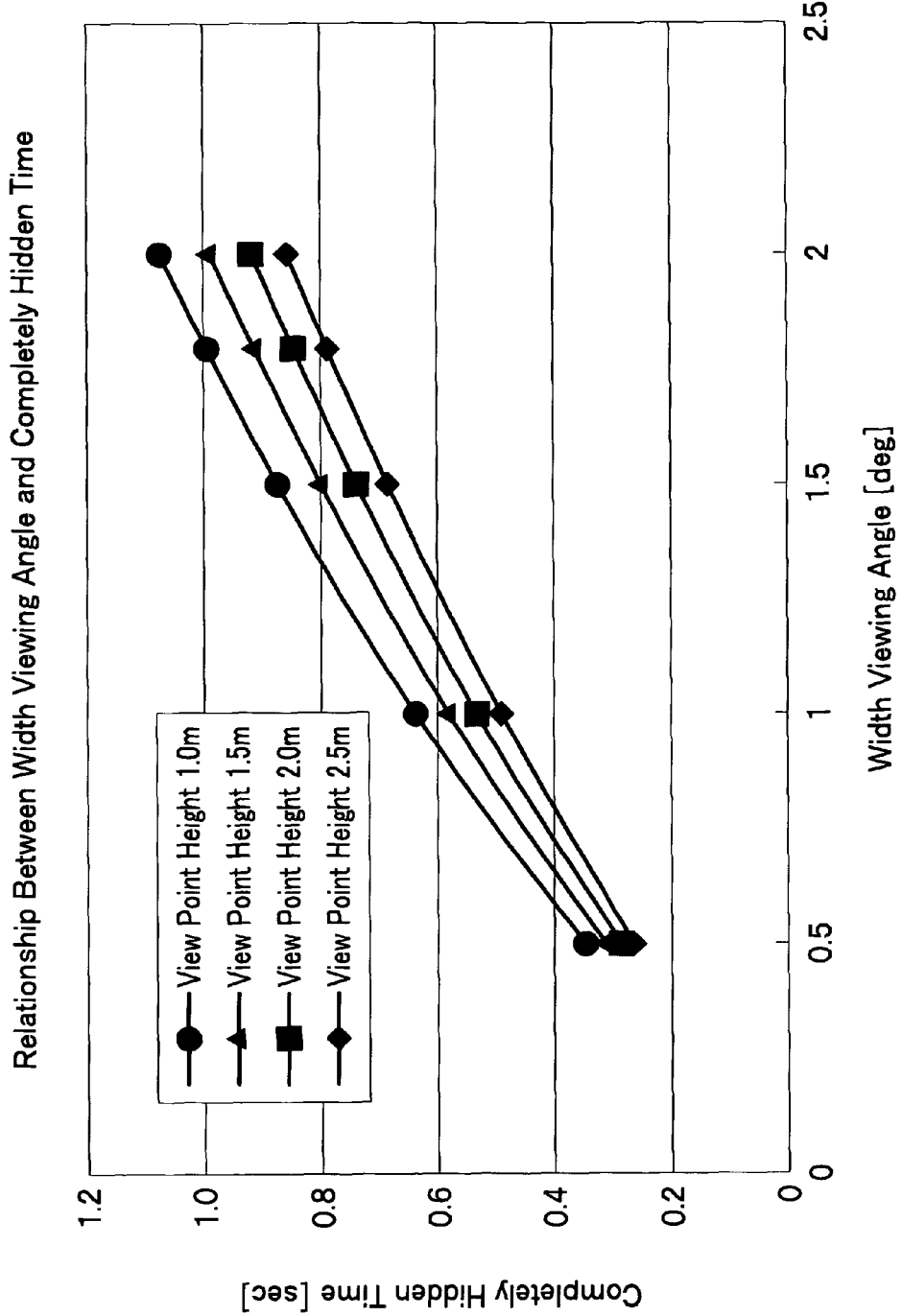

VEHICLE FOR ENHANCING RECOGNITION ACCURACY OF VISUAL INFORMATION

BACKGROUND OF THE INVENTION

1. Field of the Invention

The present invention relates to a vehicle, and more particularly, to a vehicle of which a recognition accuracy of visual information such as a following distance visually recognized by a driver is enhanced.

2. Description of the Related Art

A driver of a vehicle recognizes an object such as another vehicle by vision, and performs a situational judgment and a driving operation. At this time, if scenery around is too seeable, driver's fatigue and drowsiness become strong in some case. Consequently, by restricting a part of a view according to a driving situation, it is performed that the driver's fatigue and drowsiness are prevented and that safety driving is ensured.

For example, in Japanese Patent Laid-Open Publication No. 2000-211355 (paraphrases 0009 to 0016, FIG. 5) is disclosed a technology of: detecting such an actual vehicle speed and a following distance; and for example, in a case that the actual vehicle speed is a high speed and that the following distance is sufficient, obtaining a height h restricting a view according to a predetermined calculation method and blocking light by the height h from a lower end vicinity of a front window; and in such a case that the actual vehicle speed is a middle or low speed and that the following distance is short, not performing the view restriction.

Furthermore, in Japanese Patent Laid-Open Publication No. 2005-14884 (paraphrases 0013 to 0026, FIG. 1) is disclosed a view adjustment method of a vehicle intended to make a break line of a view adjustment portion provided at a lower area of a front window to be a shape deviated from a linear shape seen as being horizontal in straight proceeding or else to change in advance the break line according to a swivel condition such as a vehicle-body roll angle; thereby to make driver's equilibrium sense stable; and thereby to enable a fluctuation of a head portion inclination angle to be suppressed.

Furthermore, in Japanese Patent Laid-Open Publication No. H 06-72151 (paraphrases 0014 to 0022, FIG. 1) is disclosed a vision clearing device configured to overlap a yellow sheet and a polarized sheet and to compose a composite sheet, to attach the composite sheet to a sun visor at an upper portion of a front window in a vehicle cabin, to movably provide the composite sheet so as to cover a driving view, and thereby to block obstructive glaring light; and thus enabled to make it easy to perform a visual observation.

In this connection, recently upsizing a front window of a vehicle is progressing for the purpose of enhancing a visibility in the vicinity of the vehicle and an open feeling in the vehicle cabin, and information included in a driver's view is increased. Therefore, it is requested to speedily and accurately recognize requested information out of a vast amount of visual information and to ensure driving safety.

However, because the device recited in the Japanese Patent Laid-Open Publication No. 2000-211355 blocks light for a front window, a part of a view results in being completely blocked when restricting the view. Therefore, there is a possibility that requested information is additionally cut.

Furthermore, because the device recited in the Japanese Patent Laid-Open Publication No. 2000-211355 needs such a mechanism for making a view restriction range up and down and a sensor for detecting a driving situation and an ambient situation, it invites the increase of a parts number and the complication of its configuration.

Furthermore, a driver's seat of a vehicle is normally offset right or left with respect to a center of the vehicle. Therefore, if making a part of the vehicle symmetrically made, for example, such a lower end of a front window a reference and trying to recognize a distance and a relative speed from/to another vehicle, a larger error tends to occur.

But, in the device recited in the Japanese Patent Laid-Open Publication No. 2005-14884 cannot be eliminated the error of a recognition accuracy of visual information due to a driver's position being offset with respect to the center of a vehicle.

Furthermore, because an optical system of human being's eyes has a color aberration, a blue thing is seen smaller than its actual size, and a red thing is seen larger than its actual size. Therefore, there is a possibility of erroneously recognizing a blue thing as existing farther than actual.

But although the device recited in the Japanese Patent Laid-Open Publication No. H 06-72151 can block obstructive glaring light, the error of a recognition accuracy of visual information due to a color aberration cannot be eliminated.

Consequently, there is a need for providing a vehicle that has a safe and simple configuration and that can enhance the recognition accuracy of visual information.

SUMMARY OF THE INVENTION

According to a study of the inventors, if using points (that is, points existing at an equal distance from a driver), where a looking-down angle from the driver is constant, as one of references in recognizing a following distance and a relative speed, it has been found that a recognition accuracy of the following distance and the relative speed is enhanced. The present invention has been invented on the basis of such the knowledge.

A vehicle related to the present invention comprises a front window having a light transmission characteristic and separated into a first area and a second area provided below the first area, wherein a boundary between the first area and the second area is provided so that the looking-down angle from a driver is constant.

The boundary B between the first area and the second area is provided so that a looking-down angle $\theta$ is constant when the driver D looks at the boundary B. In other words, the boundary B is provided along intersections Q ($Q_1$, $Q_2$, $Q_3$, ...) between respective lines, which connect points P ($P_1$, $P_2$, $P_3$, ...) on a plane (road face) existing at an equal distance from eyes E of the driver D to the eyes E, and the front window or the side windows.

In accordance with such the configuration, because the front window is separated into the first area and the second area and the boundary therebetween is provided so that the looking-down angle is constant, a reference, that is, points existing at an equal distance from a driver, of the looking-down angle being constant seen from her/him becomes clear; thus the recognition accuracy of visual information is enhanced.

Furthermore, because the front window has the light transmission characteristic, light is not completely blocked by being separated. In other words, because the front window is separated without losing the light transmission characteristic, requested information is not cut. Accordingly, safety is not damaged.

Furthermore, a boundary line is preferably drawn to a boundary between the first area and the second area.

In accordance with such the configuration, because the boundary line drawn to the front window functions as a reference of the looking-down angle being constant, the recognition accuracy of visual information is enhanced. Furthermore, if the front window is separated by the boundary line, it is possible to provide the reference on the front window in recognizing a following distance and a relative speed from/to an object without damaging the light transmission characteristic of the front window. In addition, the boundary line may also be formed to be translucent; and to be opaque if its width does not block a view.

Furthermore, the light transmission characteristic of the second area is preferably configured so as to differ from that of the first area.

In accordance with such the configuration, because the light transmission characteristics of the first area and the second area are different, it is possible to visually recognize the boundary therebetween. Then, because such the boundary is formed so that looking-down angle from a driver is constant, the recognition accuracy of visual information is enhanced by making the looking-down angle a reference.

In addition, in the light transmission characteristic of the front window, that of the front window itself may be changed; and combining another member with the front window, the light transmission characteristic may also be changed. To be more precise, the light transmission characteristic may be changed by using color glass, providing an intermediate layer in glass, and sticking a translucent film (filter) on the front window.

Furthermore, a visual light transmissivity of the second area is preferably made to be not less than 20% lower than that of the first area.

Furthermore, it is preferable to configure so that the first area has a light transmission characteristic of attenuating light in a wavelength range of 380 nm to 470 nm by at least 60% and transmitting light in a wavelength range of 510 nm to 780 nm by at least 70%; and so that the second area has a light transmission characteristic of attenuating light in a wavelength range of 520 nm to 570 nm by at least 50%.

In accordance with such the configuration, because the first area has the light transmission characteristic of attenuating the light of the wavelength range of 380 nm to 470 nm by at least 60% and transmitting the light of the wavelength range of 510 nm to 780 nm by at least 70%, it is possible to attenuate light in a range of blue excluding a blue signal (470 nm to 510 nm). Although blue light tends to be scattered because of its shorter wavelength and has a characteristic of lowering a driver's visibility, such the blue light of the wavelength range of 380 nm to 470 nm is attenuated; therefore, a contrast of an object T is enhanced and its visibility is increased.

In addition, it is more preferable to attenuate light in a wavelength range of 470 nm to 475 nm by at least 30%.

Furthermore, because the second area has the light transmission characteristic of attenuating light of the wavelength range of 520 nm to 570 nm by at least 50%, it can attenuate shorter wavelength light than red such as yellow and green. Thus a brightness contrast of red light used in such a traffic signal and a brake lamp of a preceding vehicle is enhanced, and the visibility of the red light is increased.

Furthermore, the first area and the second area are preferably extended to side windows.

In accordance with such the configuration, it is possible to enhance also the recognition accuracy of visual information from lateral directions.

Furthermore, the front window is preferably configured so as to further comprise a third area above the first area separated therefrom.

In accordance with such the configuration, because the front window is separated into the first, second, and third areas, an interval in an up and down direction of the first area becomes smaller. Therefore, an object seen in a vicinity of a middle portion of the first area and a boundary between each area, which the boundary becomes a reference in recognizing a distance and speed of the object, result in approaching, and thus the recognition accuracy of the distance and speed of the object is enhanced. Furthermore, because the interval in the up and down direction is narrowed, another vehicle's area change in a view generated due to a change of a relative speed is felt to be larger. Therefore, it becomes sensitive to recognize the change of a following distance and a relative speed, and thus safe driving becomes possible.

Here, a boundary between the first area and the third area is preferably provided so that an angle made by a line connecting driver's eyes to a center position in the up and down direction of the first area and another line connecting the driver's eyes to the boundary between the first area and the third area is 6° to 8°.

In accordance with such the configuration, because the boundary between the first area and the third area is provided so that the angle made by the line connecting the driver's eyes to the center position in the up and down direction of the first area and another line connecting the driver's eyes to the boundary between the first area and the third area is 6° to 8°, it is possible to ensure a sufficient time and interval by when a vehicle stops after important information is visually recognized in the vicinity of the boundary between the first area and the third area.

In addition, according to the study of the inventors et al. the angle is preferably made to be 6° to 8°, and most preferably made to be 7°. Making the angle 7°, when a traffic signal (ground height 6.4 m) is found in the vicinity of the boundary between the first area and the third area seen from a driver during driving at 60 km per hour, the vehicle can be stopped to be short of 10 m of the signal even when the signal changes to "red."

Furthermore, a boundary line is preferably drawn to the boundary between the first area and the third area.

In accordance with such the configuration, because the front window can be separated by the boundary line, it is possible to provide a reference on the front window in recognizing a following distance and a relative speed from/to an object without damaging the light transmission characteristic of the front window.

Furthermore, a light transmission characteristic of the third area is preferably configured to differ from that of the first area.

In accordance with such the configuration, because the light transmission characteristics of the first and third areas are different, it is possible to visually recognize the boundary therebetween. Therefore, by using such the boundary as a reference in recognizing a distance and a speed from/to an object, it is possible to enhance the recognition accuracy of visual information.

Furthermore, the third area preferably has a light transmission characteristic of attenuating light in a wavelength range of 520 nm to 570 nm by at least 50%.

In accordance with such the configuration, because the third area has a light transmission characteristic of attenuating light in a wavelength range of 520 nm to 570 nm by at least 50%, it can attenuate shorter wavelength light than red such as yellow and green. Thus a brightness contrast of red light used in such a traffic signal and a brake lamp of a preceding vehicle is enhanced, and the visibility of the red light is increased.

Furthermore, the third area is preferably extended to side windows.

BRIEF DESCRIPTION OF THE DRAWINGS

FIG. 9A shows an experiment condition; and FIG. 9B shows an experiment result.

FIG. 12 is a graph showing a relationship between a width viewing angle and a completely hidden time for every view point height.

BEST MODES FOR CARRYING OUT THE INVENTION

Here will be described best modes for carrying out the present invention in detail, referring to drawings. In a description a same symbol will be appended to a same element, and a duplicate description thereof will be omitted.

First Embodiment

Figure 1:
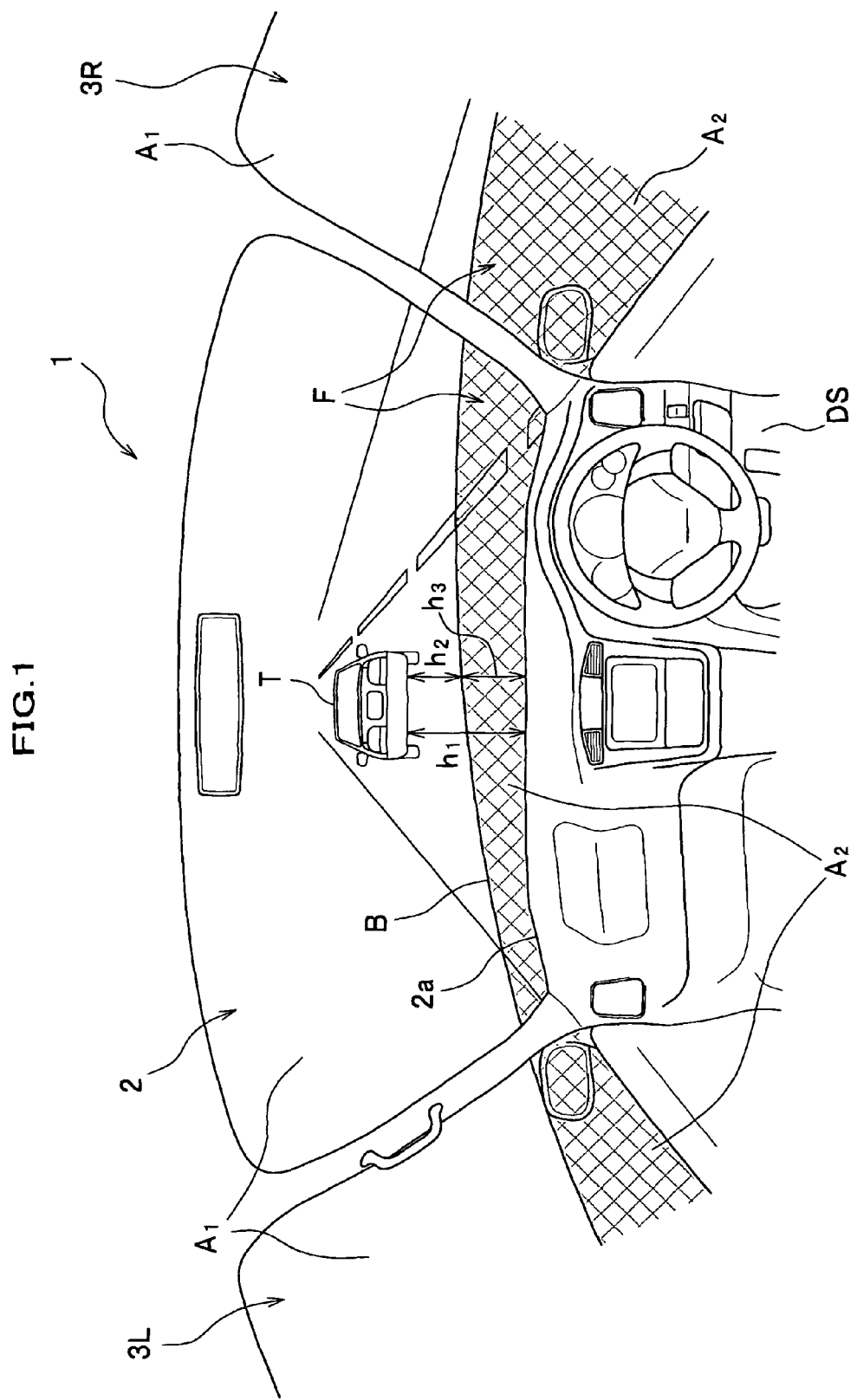
FIG. 1 is an elevation view showing a front window and side windows of a vehicle related to a first embodiment of the present invention.
Figure 2:
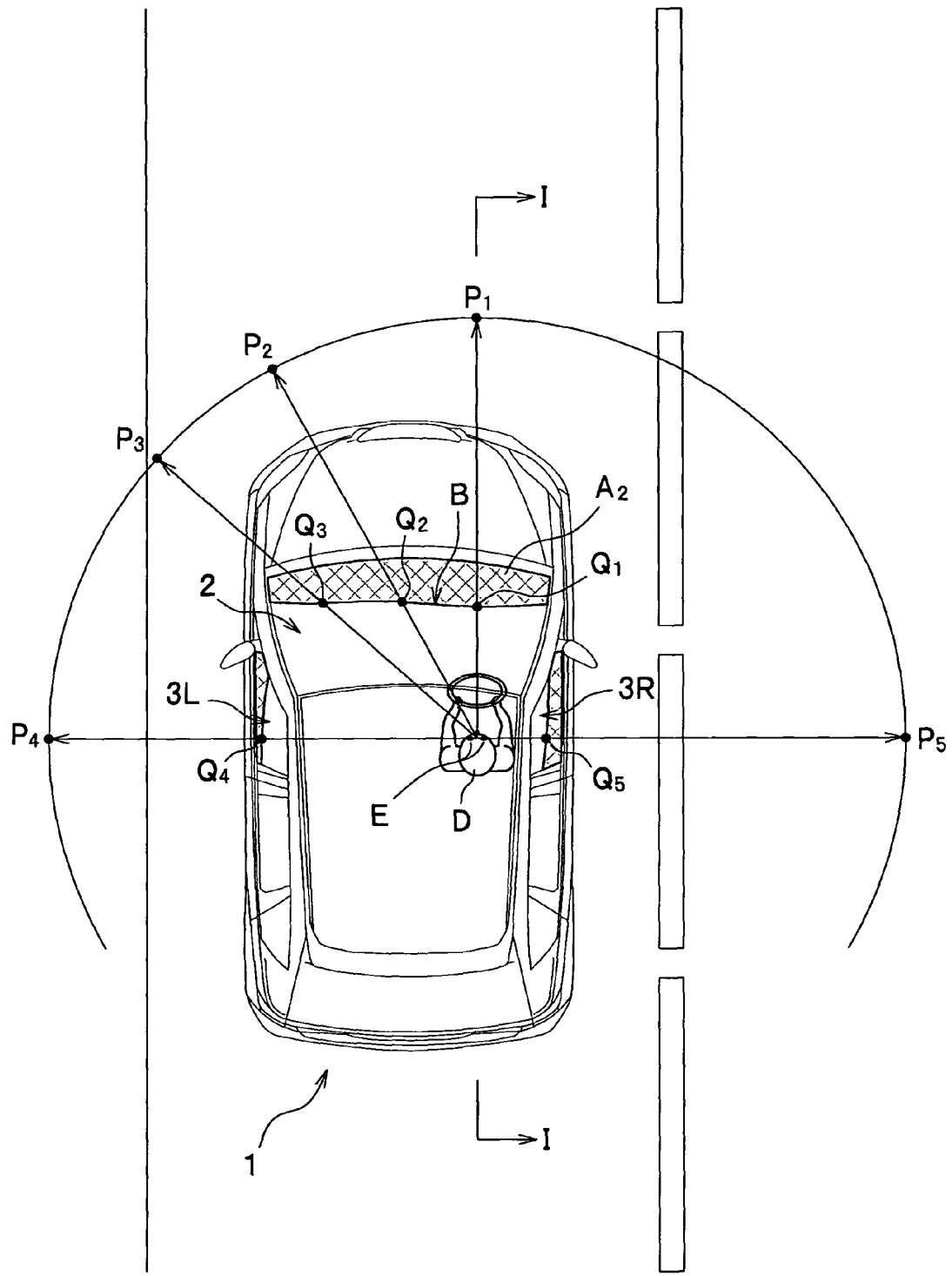
FIG. 2 is a plan view of the vehicle related to the first embodiment.
Figure 3:
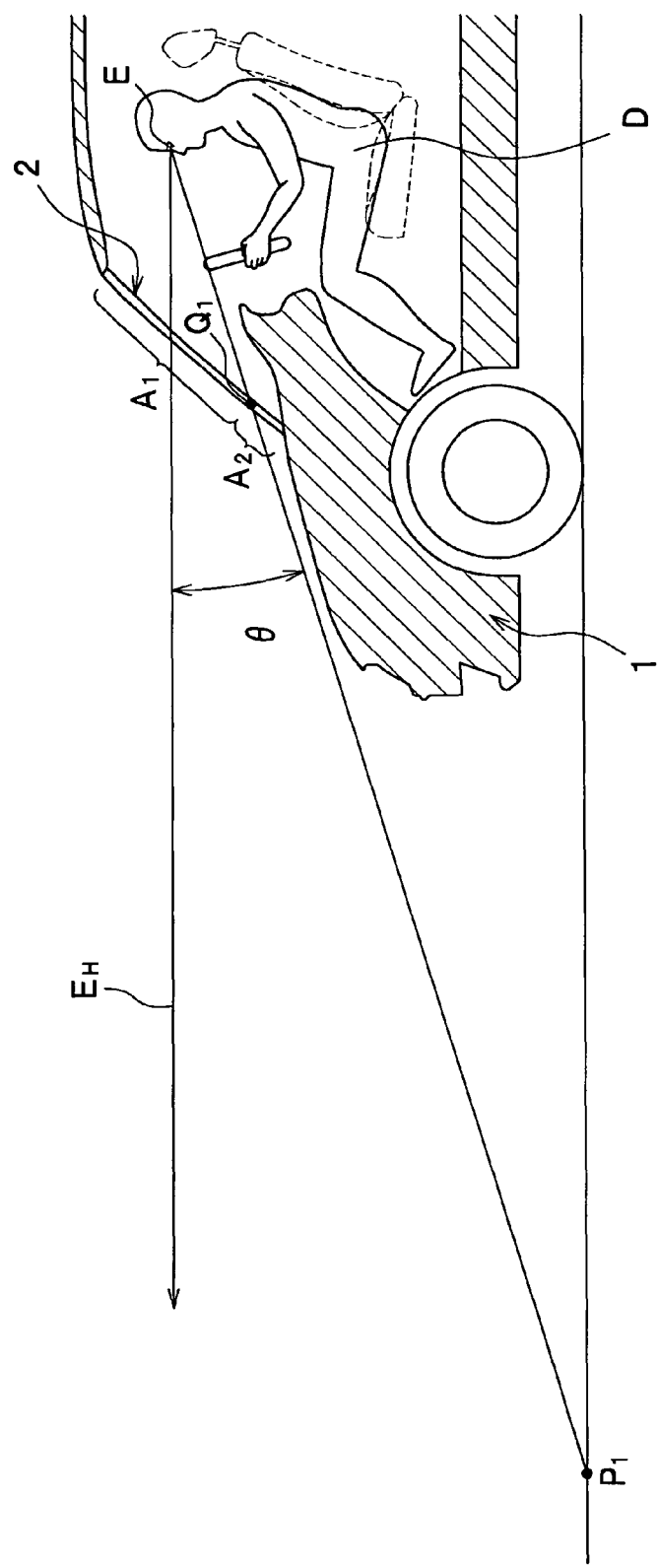
FIG. 3 is an I-I section view of the vehicle related to the first embodiment.

FIG. 1 is a drawing showing a front window and side windows of a vehicle related to a first embodiment of the present invention from a driver's view point. FIG. 2 is a plan view of the vehicle related to the first embodiment. FIG. 3 is an I-I section view of FIG. 2.

A vehicle 1 related to the first embodiment comprises, as shown in FIG. 1, one front window 2 and two side windows 3 (3L, 3R). Furthermore, a driver's seat DS related to the first embodiment is offset right with respect to the middle of the vehicle 1.

The front window 2 is a window made of glass provided before the driver's seat DS, and expresses a symmetrical shape with respect to the middle of the vehicle 1. In the first embodiment, as shown in FIG. 1, a second area $A_2$ is formed by sticking a translucent film F on a lower area of the front window 2. In other words, the front window 2 is separated into a first area $A_1$ of which a light transmission characteristic is not changed and the second area $A_2$ of which a light transmission characteristic is changed by the film F. An upper edge (lower edge of the first area $A_1$) of the second area $A_2$ is recognized as a boundary B by a driver D (see FIG. 2).

The side windows 3L, 3R are windows made of glass provided at both sides of the driver's seat DS, and are symmetrically arranged with respect to the middle of the vehicle 1. In the first embodiment also on the side windows 3L, 3R are stuck the films F, and thereon are provided the first area $A_1$ and the second area $A_2$.

A "looking-down angle" $\theta$ is an angle that is formed between a driver's horizontal eye line $E_H$ and a second line, the second line connecting a driver's eyes to a point on a plane. As depicted in FIG. 2 and FIG. 3, the plane may be a road face. For example, as shown in FIG. 3, the looking down angle $\theta$ is formed between the driver D's horizontal eye line $E_H$ and a second line [E, $P_1$] connecting the driver D's eyes E to the point $P_1$ on the road surface. The boundary B between the first area $A_1$ and the second area $A_2$, as shown in FIGS. 2 and 3, is provided so that a looking-down angle $\theta$ is constant when the driver D looks across the boundary B. In other words, as shown in FIG. 2, the boundary B is provided along intersections Q ($Q_1$, $Q_2$, $Q_3$, . . . ) where respective lines intersect the front window 2 or the side windows 3L, 3R. Each one of the respective lines connects one of the points P ($P_1$, $P_2$, $P_3$, . . . ) to the eyes E of the driver D. In FIG. 2 and FIG. 3, each of the points in the set P ($P_1$, $P_2$, $P_3$, . . . ) is located on the same plane (the road face), and each individual point in the set P is located at an equal distance from the eyes E of the driver D as compared to every other point in the set P. For example, as shown in FIG. 3, intersection $Q_1$ forms a point on the boundary B between the first area $A_1$ and the second area $A_2$. Intersection $Q_1$ exists at the point where the line [E, $P_1$] intersects the front window 2. Because each of the points P are an equal distance from the eyes E of the driver D, the looking-down angle $\theta$ between a horizontal eye line $E_H$ and each of the respective lines [E, P] is the same. A driver D looking across boundary B accordingly maintains a constant looking-down angle $\theta$. Therefore, the driver D can accurately recognize that, for example, the point $P_1$ on the road face seen through the intersection $Q_1$ on the boundary B and the point $P_3$ on the road face seen through the intersection $Q_3$ on the boundary B exist at an equal distance from herself/himself. In other words, by making the boundary $B_3$ where the looking-down angle $\theta$ is constant, a reference, it is possible to accurately recognize a distance feeling to an object T.

Furthermore, the object T such as a preceding vehicle running before the vehicle 1 is often seen at an approximate middle in an up and down direction of the front window 2. Accordingly, as shown in FIG. 1, the boundary B is positioned further near the object T, compared to a lower edge 2a of the front window 2. In other words, an interval $h_2$ between the boundary B and the object T is smaller than an interval $h_1$ between the lower edge 2a of the front window 2 and the object T. On the other hand, the lower edge 2a of the front window 2 is not symmetrical with respect to the driver D (displaced left). Therefore, when the driver D recognizes a distance to the object T, making the boundary B a reference is nearer in interval and more symmetrical with respect to her/him than making the lower edge 2a of the front window 2 a reference; therefore, she/he can more accurately recognize the distance to the object T.

Furthermore, in the first embodiment is used the film F of which a visible light transmissivity is not less than 20% lower than glass composing the front window 2. Therefore, a light beam input into the eyes E of the driver D from the second area $A_2$ decreases, and visual information is reduced. Particularly, in high speed driving visual information reflected at a peripheral edge of the front window 2 including the second area $A_2$ is difficult to be identified because it flows backward extremely fast; therefore, it is possible to prevent the fatigue of the driver D by rather reducing the visual information to some extent. Furthermore, because the second area A2 has a light transmissivity not less than a definite value, requested information can be acquired. Therefore, safety can be ensured at lower speed driving.

Furthermore, because unrequested visual information is reduced by partly restricting a view with the film F, it becomes easier to memorize acquired information. In other words, by reducing visual information unrequested for a driving judgment included in the second area $A_2$, it is possible to contribute to a rise of a judgment speed For example, in a case of the driver D judging a left or right turn, it often goes through a process of her/his firstly seeing front, then moving her/his view to left and right, confirming an ambient situation, again seeing the front, and performing the judgment; however, in this case, if cutting unrequested information in advance by the film F, the first front information is reduced and the ambient situation becomes easier to be memorized; and therefore, when again seeing the front, it is possible to speedily and easily recognize a difference from the first front information.

Second Embodiment

Figure 4:
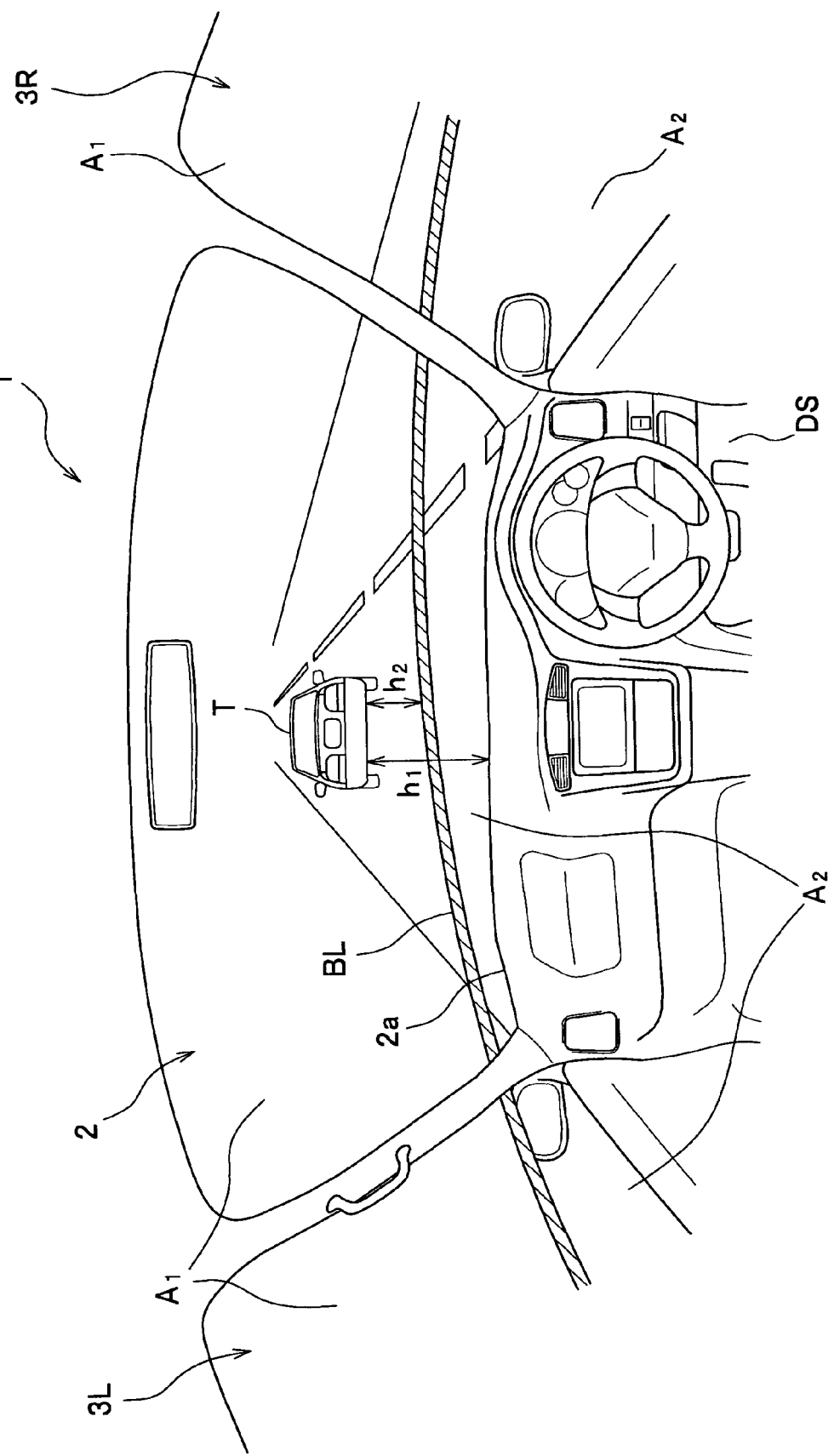
FIG. 4 is an elevation view showing a front window and side windows of a vehicle related to a second embodiment of the present invention.

FIG. 4 is a drawing showing a front window and side windows of a vehicle related to a second embodiment of the present invention from a view point of a driver.

The vehicle 1 related to the second embodiment differs, as shown in FIG. 4, from the first embodiment in a point that the front window 2 and the side windows 3 are separated into the first area A1 and the second area A2 by providing a boundary line BL in the window 2 and the windows 3.

The front window 2 is, as shown in FIG. 4, separated into the first area $A_1$ and the second area $A_2$. Such the boundary line BL is provided along positions (symbol Q ($Q_1$, $Q_2$, . . . ) in FIGS. 2, 3) where the looking-down angle θ of the driver D is constant. Therefore, the driver D can accurately recognize points on a road face existing at an equal distance from herself/himself, making the boundary line BL a reference. Furthermore, because the interval $h_2$ between the boundary line BL and the object T is smaller than the interval $h_1$ between the lower edge 2a of the front window 2 and the object T, the driver D can accurately recognize a distance to the object T, compared to a case of judging the distance, making the lower edge 2a of the front window 2 a reference.

Furthermore, because the first area $A_1$ and the second area $A_2$ both have the same light transmission characteristic of the front window 2, the view of the driver D is not blocked. Therefore, requested information is not cut, and it is possible to enhance the recognition accuracy of visual information while ensuring driving safety.

In addition, in the second embodiment, although the boundary line BL is configured by sticking an opaque narrow tape on the front window 2, it is not limited thereto; for example, it may also be configured by sticking a translucent colored tape. Furthermore, the boundary line BL may also be formed not by a tape but by directly coloring the front window 2. A width of the boundary line BL is preferably small as far as visually recognizable. The width of the boundary line BL will be described in detail later.

Third Embodiment

Figure 5:
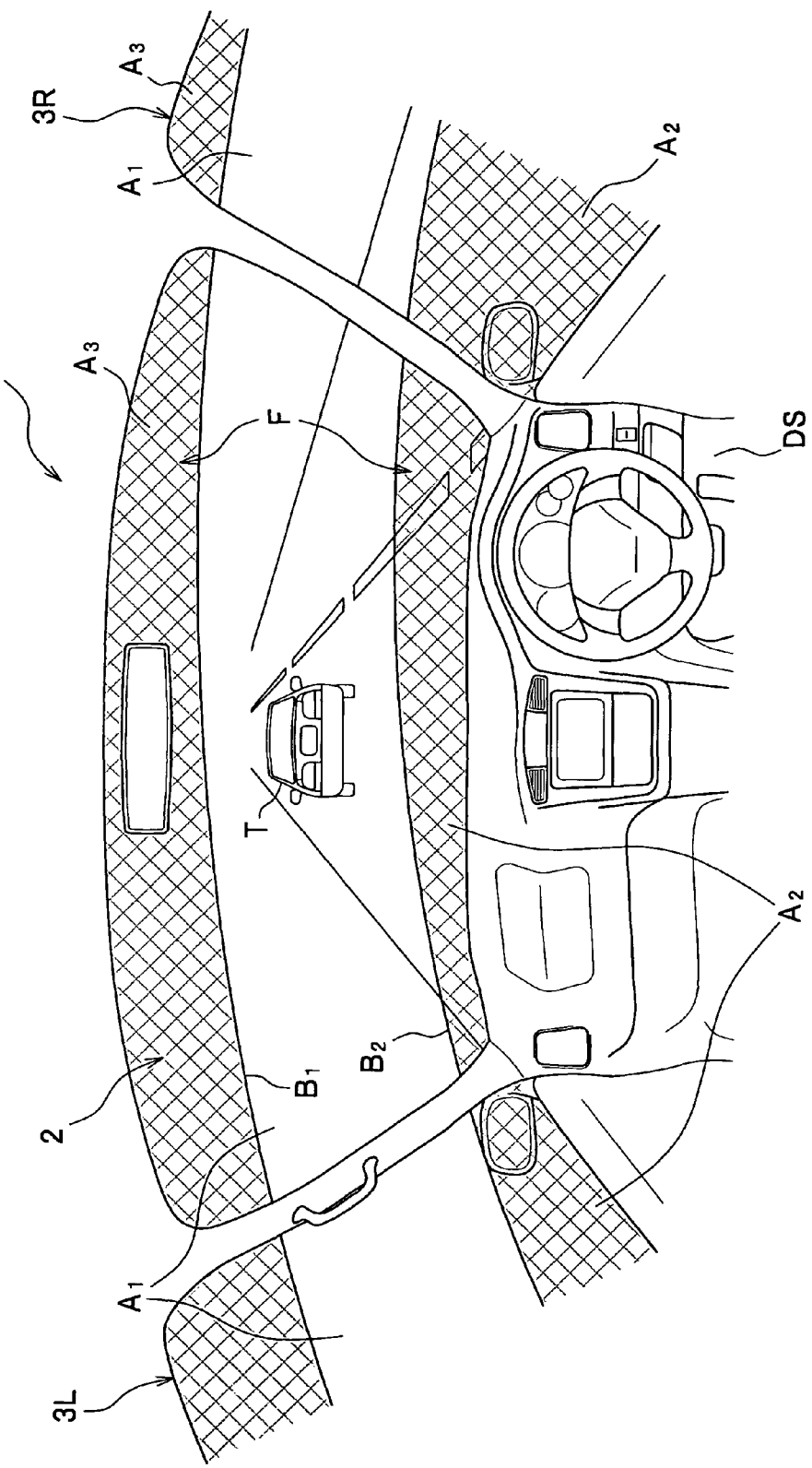
FIG. 5 is an elevation view showing a front window and side windows of a vehicle related to a third embodiment of the present invention.

FIG. 5 is a drawing showing a front window and side windows of a vehicle related to a third embodiment of the present invention from a view point of a driver.

Figure 6:
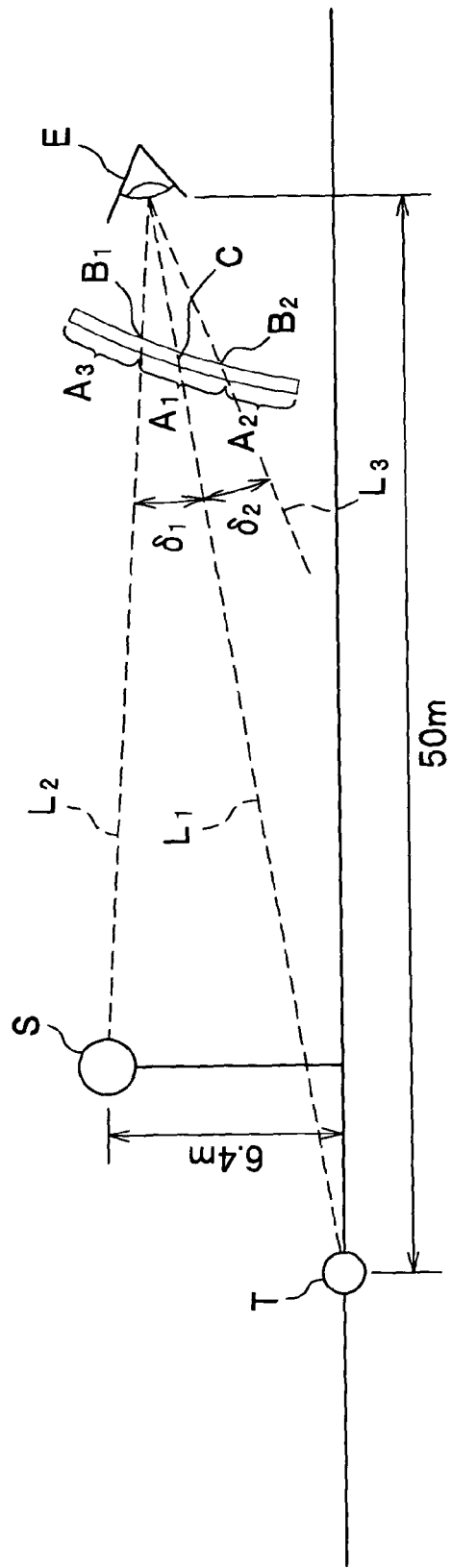
FIG. 6 is an illustration drawing showing a relationship between each boundary of a first area, a second area, and a third area, and driver's eyes.

FIG. 6 is an illustration drawing showing a relationship between each boundary of a first area, a second area, and a third area, and driver's eyes.

The vehicle 1 related to the third embodiment differs, as shown in FIG. 5, from the first and second embodiments in a point that the front window 2 and the side windows 3 are separated into three, the first area $A_1$, the second area $A_2$, and the third area $A_3$.

In the front window 2 and the side windows 3 of the vehicle 1 related to the third embodiment, as shown in FIG. 5, the films F are stuck on an upper portion and lower portion thereof, and the third area $A_3$ and the second area $A_2$ are formed by the films F, respectively. Therefore, a size of the first area $A_1$ becomes smaller, and an area change of the object T is felt larger with respect to the first area $A_1$. Thus is enhanced the recognition accuracy and sensitivity of a distance feeling between the vehicle 1 and the object T.

A boundary (hereinafter referred to as "lower boundary $B_2$") between the first area $A_1$ and the second area $A_2$ is provided so that the looking-down angle θ is constant, similarly to those of the first and second embodiments. Therefore, by making the lower boundary $B_2$ a reference, it is possible to more accurately recognize a distance to the object T. In addition, because the second area $A_2$ is similar to that of the first embodiment, a detailed description of the area $A_2$ will be omitted.

The third area $A_3$ is an area formed on an upper portion of the front window 2, and is separated from the first area $A_1$ by sticking the film F and changing a visible light transmissivity. To be more precise, the third area $A_3$ is lowered not less than 20% in visible light transmissivity than the first area $A_1$ (that is, the front window 2 itself) by the film F. Therefore, unrequested visual information is reduced, and the fatigue of the driver D can be lessened.

Furthermore, the third area $A_3$ is formed at a safe position with respect to requested visual information such as a traffic signal. This will be described in detail, referring to FIG. 6.

A boundary (hereinafter referred to as "upper boundary $B_1$") between the first area $A_1$ and the third area $A_3$ is provided at a point by which the vehicle 1 can be stopped to be short of 10 m of a traffic signal Sg with ground height 6.4 m, in a case of pushing a brake when the signal Sg is found at a position overlapping the upper boundary $B_1$ seen from the driver D during driving at 60 km per hour. To be more precise, the upper boundary $B_1$ is provided, as shown in FIG. 6, so that an angle $\delta_1$ made by a line (hereinafter referred to as "gaze line $L_1$" in some case), which connects the eyes E of the driver D to a center position C in an up and down direction of the first area $A_1$, and another line (hereinafter referred to as "upper view line $L_2$"), which connects her/his eyes E to the upper boundary $B_1$, is 7°. According to the study of the inventors et al., if forming the upper boundary $B_1$ at such the position, the vehicle 1 can be stopped short of about 10 m from the traffic signal Sg even in a case that the signal Sg changes to red when the signal Sg is found at a position overlapping the upper boundary $B_1$ seen from the diver D during driving at 60 km per hour.

Furthermore, in general, when a human being sees an area surrounded by a frame, she/he tends to gaze at its center.

Therefore, if setting the upper boundary $B_1$ and the lower boundary $B_2$ so that the center position C in the up and down direction of the first area $A_1$ is positioned at an intersection of a line, which connects her/his eyes E to a point requested for the driver D to gaze to, and the front window 2, it is possible to make her/him gaze at the point requested for her/him to gaze. In the third embodiment, as shown in FIG. 6, the first area $A_1$ is provided so that a road face before 50 m from her/him is reflected, seen from the driver D, at the center position C in the up and down direction of the first area $A_1$.

In addition, thus configured, approximately equal become the angle $\delta_1$ made by the upper view line $L_2$ and the gaze line $L_1$ and an angle $\delta_2$ made by a line (hereinafter referred to as "lower view line $L_3$") connecting the eyes E of the driver D to the lower boundary $B_2$ and the gaze line $L_1$. Furthermore, in general, the traffic signal Sg is placed at a height of 6.4 m from the ground in many cases.

Figure 7:
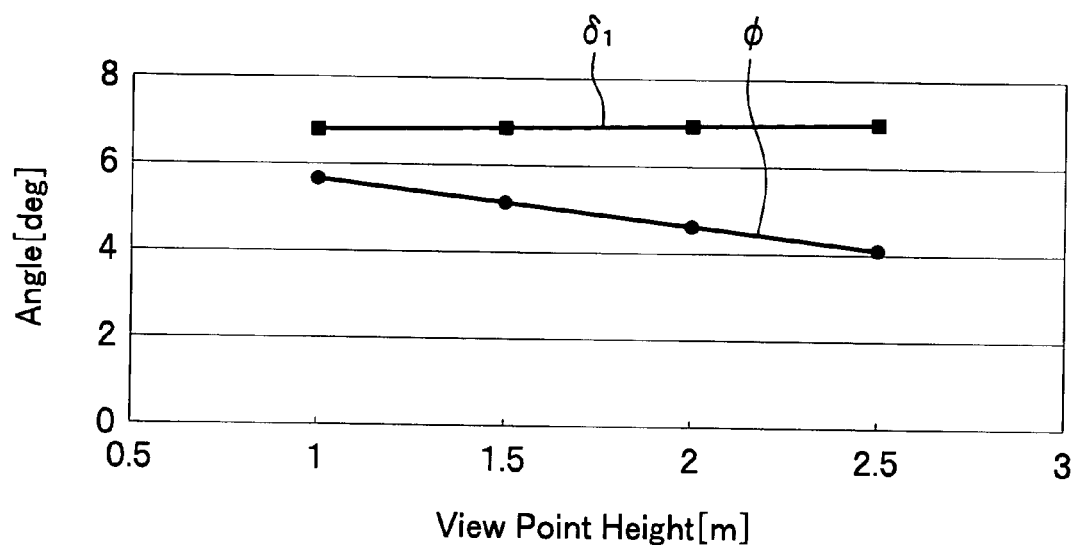
FIG. 7 is a graph showing a relationship between an angle made by an upper view line and a gaze line, and a height of a view point; and a relationship between an angle made by the upper view line and a horizontal eye line, and the height of the view point.

FIG. 7 is a graph showing a relationship between the angle $\delta_1$ made by the upper view line $L_2$ and the gaze line $L_1$, and a height of a view point; and a relationship between an angle $\phi$ made by the upper view line $L_2$ and a horizontal eye line $E_H$ (see FIG. 3), and the height of the view point.

According to the study of the inventors et al., as shown in FIG. 7, the larger the height of a view point from the ground becomes, the smaller the angle $\phi$ made by the upper view line $L_2$ and the horizontal eye line $E_H$. On the other hand, the angle $\delta_1$ made by the upper view line $L_2$ and the gaze line $L_1$ is constant almost regardless of the height of the view point from the ground. This is because not only the upper view line $L_2$ but also the gaze line $L_1$ move, accompanied with a positional change of the eyes E. Accordingly, setting the upper view line $L_2$ with using the gaze line $L_1$, it is possible to form the third area $A_3$ exactly at a good position, not depending on a difference of a vehicle height according to a vehicle kind.

Fourth Embodiment

Figure 8:
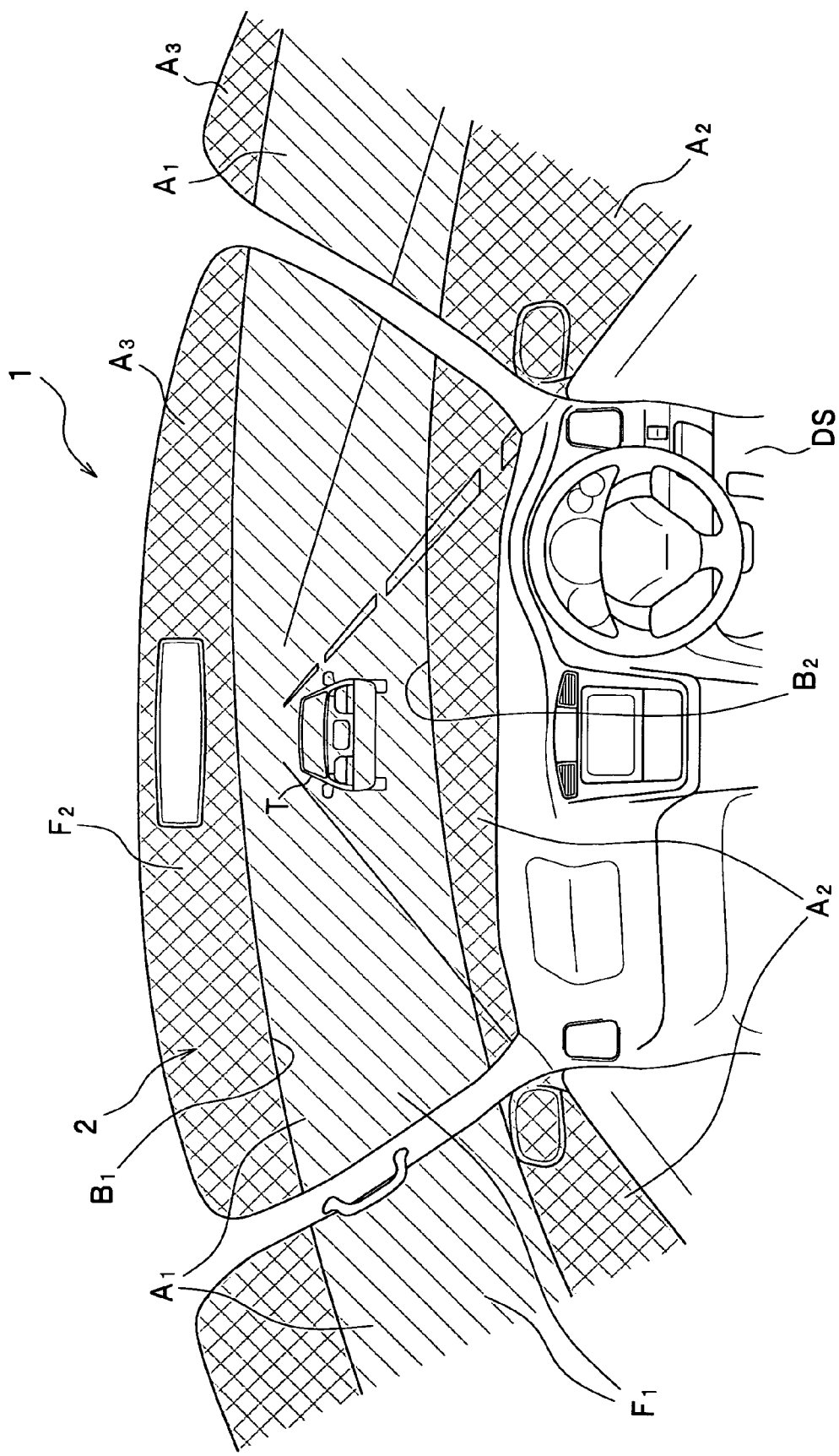
FIG. 8 is an elevation view showing a front window and side windows of a vehicle related to a fourth embodiment of the present invention.

FIG. 8 is a drawing showing a front window and side windows of a vehicle related to a fourth embodiment of the present invention from a view point of a driver.

The vehicle 1 related to the fourth embodiment differs from that of the third embodiment in a point that a film $F_1$ is stuck also on the first area $A_1$.

In the fourth embodiment the film $F_1$ stuck also on the first area $A_1$ has a light transmission characteristic of attenuating light of a blue wavelength. Generally, because there exists a color aberration in human eyeballs, a blue thing is felt farther than actual, and a red thing is felt nearer than actual. Therefore, with respect to the blue thing, there occurs a gap between a distance feeling felt by the driver D and an actual distance. Consequently, by sticking the film $F_1$ for attenuating light of a blue wavelength on the first area $A_1$, a color aberration is intended to be reduced. Thus it is possible to eliminate the gap of the distance feeling. Furthermore, because blue light is shorter in wavelength and tends to be scattered, it has the characteristic of lowering the visibility of the driver D; however, by sticking the film $F_1$ for attenuating the light of the blue wavelength on the first area $A_1$, it is possible to reduce scattered light and to enhance a contrast of the object T.

In addition, because the light of a blue signal (wavelength: 470 nm to 510 nm) is important visual information, the film $F_1$ is preferably configured to has such a light transmission characteristic of not attenuating light of a wavelength corresponding to the light of the blue signal. To be more precise, the light of the blue signal is configured to be respectively transmitted by less than 40% in light in a wavelength range of 380 nm to 470 nm; less than 70% in light in a wavelength range of more than 470 nm to 475 nm; and less than 70% in light in a wavelength range of 510 nm to 780 nm.

Furthermore, films $F_2$ stuck on the second area $A_2$ and the third area $A_3$ have a light transmission characteristic of attenuating light shorter in wavelength than yellow. To be more precise, the films $F_2$ have the light transmission characteristic of making a light transmissivity in a wavelength range of 520 nm to 570 nm less than 50%. Thus a brightness contrast of red light used in a red signal and a brake lamp of a preceding vehicle is enhanced, and the visibility becomes better.

Furthermore, because the films $F_1$ and $F_2$ have different light transmission characteristics, it becomes possible to visually recognize the upper boundary $B_1$ and the lower boundary $B_2$. Furthermore, because the lower boundary $B_2$ is provided at a position where the looking-down angle $\theta$ is constant seen from the driver D, it is possible to accurately recognize a distance to the object T. Furthermore, because the area change of the object T with respect to the first area $A_1$ becomes larger in a case of a distance between the object T and the vehicle 1 being changed, compared to a case of the third area $A_3$ not being provided, a sensitivity with respect to the change of the distance between the object T and the vehicle 1 is enhanced; thus the films $F_1$ and $F_2$ contribute to safe driving.

Figure 9A:
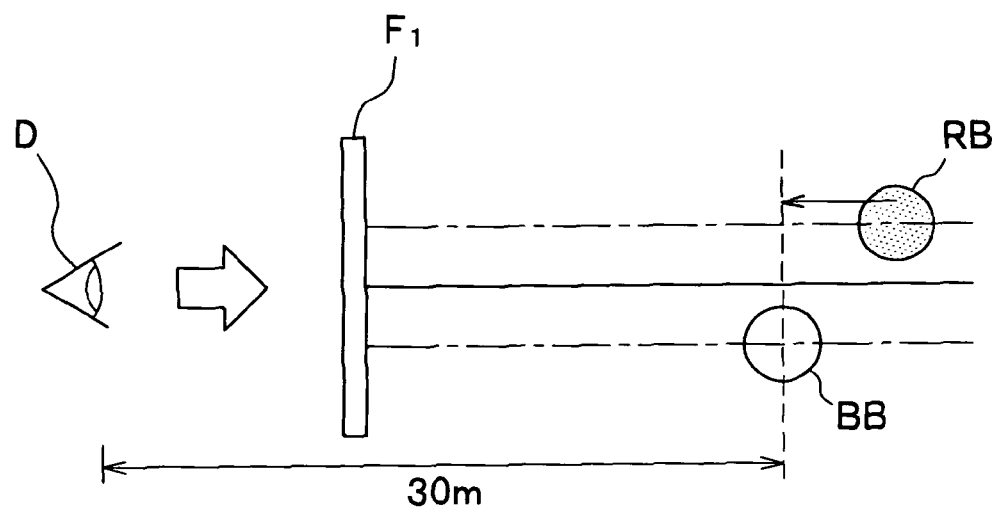
FIGS. 9A and 9B are illustration drawings illustrating a relationship between a color aberration and a distance feeling.
Figure 9B:
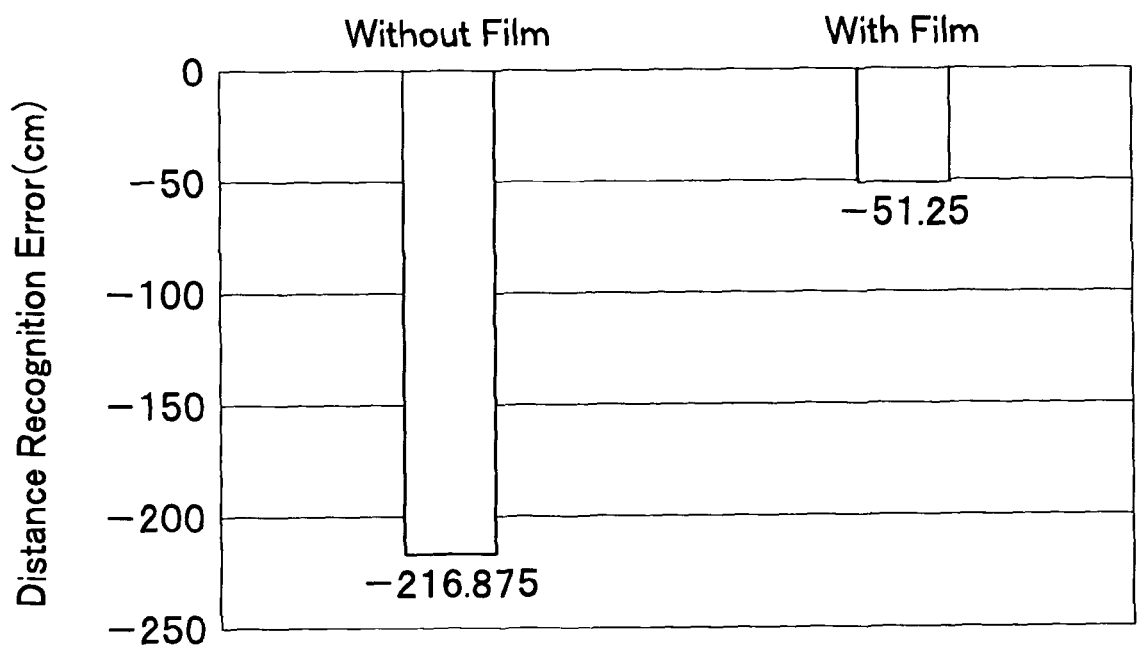

FIGS. 9A and 9B are illustration drawings of an experiment illustrating a relationship between a color aberration and a distance feeling; FIG. 9A shows an experiment condition; and FIG. 9B shows an experiment result.

The inventors et al. performed the experiment as follows:
(1) Place a blue ball BB at a position about 30 m away from the driver D, and a red ball RB near the blue ball BB;
(2) Seeing the two balls, if the driver D feels that distances to the two balls RB, BB are different with respect to her/him, move the red ball RB forward and backward, based on her/his instruction so that the distances of the two balls RB, BB become equal;
(3) Measure an interval (distance recognition error) between the red ball RB and the blue ball BB when the driver D believes their distances are equal.
(4) Place the film $F_1$ between the driver D and the two balls RB, BB, and repeat (1) to (3).

In addition, as the film $F_1$ is used a film configured to respectively transmit less than 40% of light in a wavelength range of 380 nm to 470 nm; less than 70% of light in a wavelength range of more than 470 nm to 475 nm; and less than 70% of light in a wavelength range of 510 nm to 780 nm.

By performing the experiment to four subjects, as shown in FIG. 9B, a result was obtained that: in a case of not using the film $F_1$, the distance recognition error was −216.875 cm; and in a case of using the film $F_1$, the distance recognition error was −51.25 cm. In other words, in the case of using the film $F_1$, the distance recognition error became about one fourth, compared to the case of not using the film $F_1$.

From the result thus described, if using the film $F_1$ for reducing the light of the blue wavelength, it is proved that the distance recognition error is remarkably reduced.

Fifth Embodiment

Figure 10:
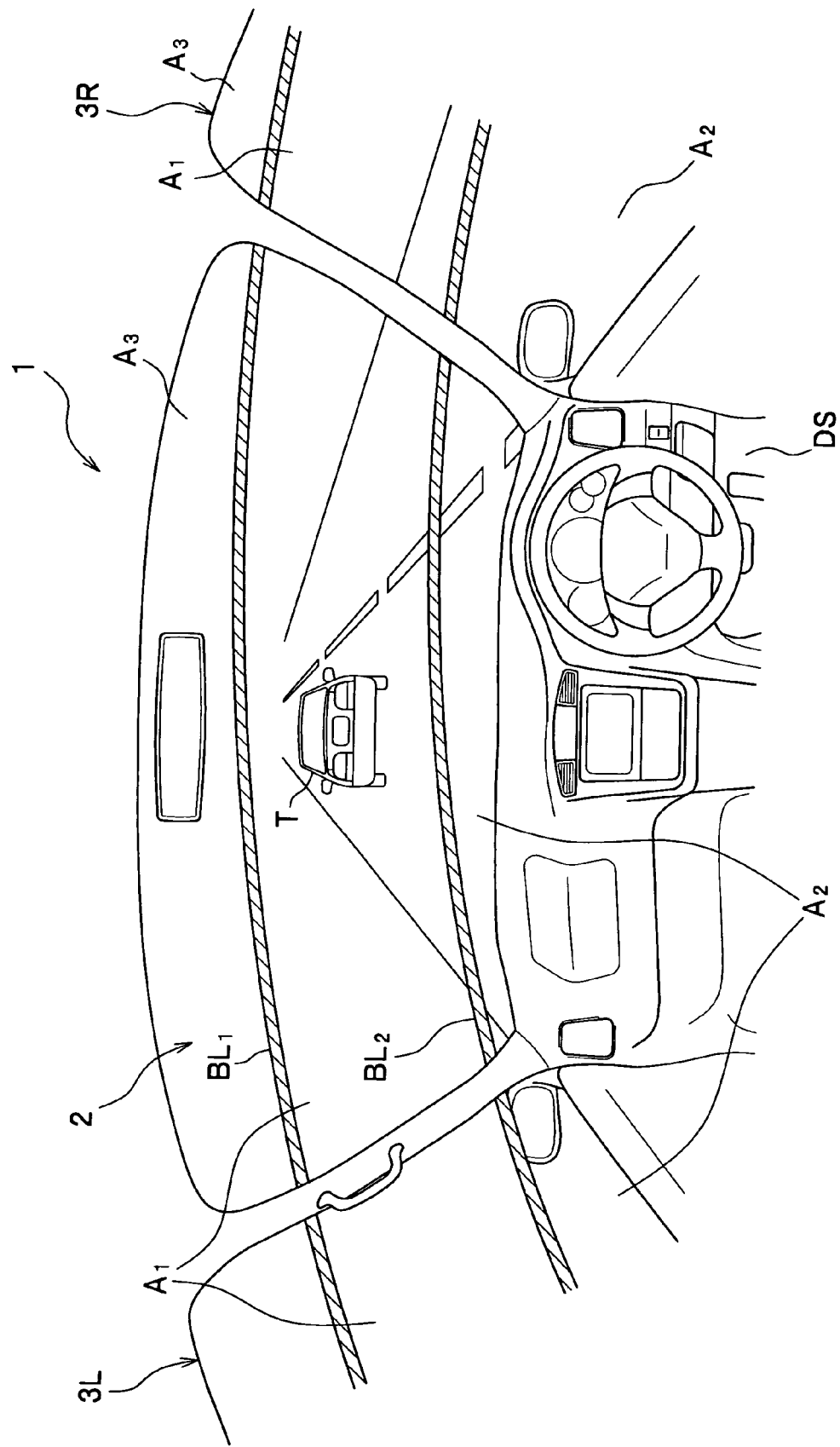
FIG. 10 is an elevation view showing a front window and side windows related to a fifth embodiment of the present invention.

FIG. 10 is an elevation view showing a front window and side windows related to a fifth embodiment of the present invention from a view point of a driver.

The vehicle 1 related to the fifth embodiment differs from the third and fourth embodiments in a point that the front window 2 and the side windows 3 are separated into the first, second, and third areas $A_1$, $A_2$, and $A_3$ by the upper boundary line $BL_1$ and the lower boundary line $BL_2$. In other words, the fifth embodiment differs from the third and fourth embodiments in a point of separating the front window 2 and the side windows 3 without using the films $F_1$ and $F_2$.

In accordance with such the configuration, because the lower boundary line $BL_2$ is provided so that the looking-down angle θ is constant seen from the driver D, it is possible to accurately recognize a distance to the object T, making the line $BL_2$ a reference.

Furthermore, because the first area $A_1$ is narrowed by the upper boundary line $BL_1$, a ratio of an area change of the object T to the first area $A_1$ becomes larger in a case of a change of a distance between the object T and the vehicle 1, and thus a sensitivity for changes of a relative speed and a distance is enhanced. Furthermore, intervals between the upper and lower boundary lines $BL_1$ and $BL_2$ to the object T are narrowed, it is possible to more accurately recognize an interval between the vehicle 1 and the object T.

Furthermore, in general, a human being tends to gaze at the vicinity of center of an area separated by a frame, and further tends to exclude visual information of a part out of the frame in its brain. Therefore, even if the film F is not used, only if drawing lines at the upper portions and lower portions of the front window 2 and the side windows 3, visual information included in outside of the lines, that is, the second area $A_2$ and the third area $A_3$ is reduced. Therefore, it is possible to reduce the fatigue of the driver D.

Here, a line width of the upper boundary line $BL_1$ is preferably configured so that an angle (viewing angle) made by a line connecting the eyes E of the driver D to an upper edge of the upper boundary line $BL_1$ and another line connecting the eyes E to a lower edge of the line $BL_1$ is 0.5° to 1.8°. If thus configured, it is possible to make a time, when the traffic signal Sg is completely hidden in the line $BL_1$, less than one second during driving at 60 km per hour while making the line $BL_1$ visible by eyes.

Figure 11:
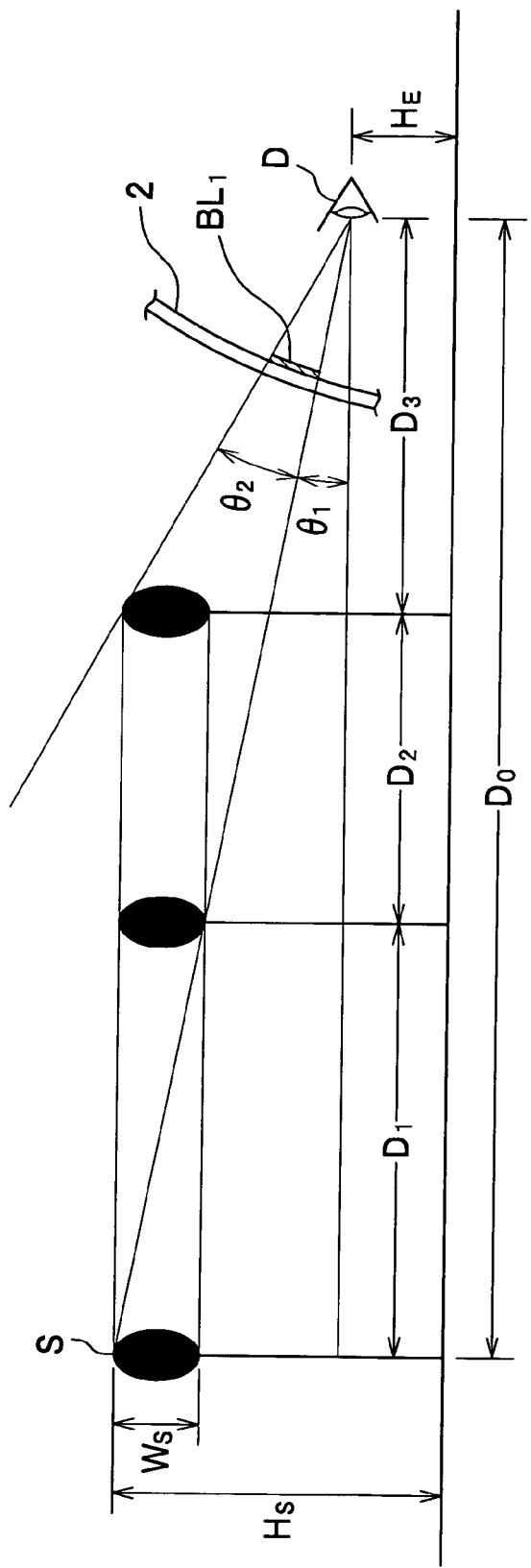
FIG. 11 is an illustration drawing illustrating a relationship among an upper boundary line, a traffic signal, and a driver's viewing angle.

FIG. 11 is an illustration drawing illustrating a relationship among an upper boundary line, a traffic signal, and a driver's viewing angle.

A relationship between a time Th when the traffic signal Sg is hidden in a shade of the upper boundary line $BL_1$ and a viewing angle $θ_2$ (hereinafter referred to as "width viewing angle $θ_2$") of the driver D corresponding to a width of the line $BL_1$ is obtained according to the following equations (1) to (6), referring to FIG. 11:

$$D_0 = V_0 * T_1 + V_0^2/2a + D_m \qquad \text{Eq. (1)}$$

$$\tan θ_1 = \frac{H_s - H_E}{D_0} \qquad \text{Eq. (2)}$$
$$= \frac{H_s - H_E}{V_0 * T_1 + V_0^2/2a + D_m}$$

$$D_1 = \frac{W_s}{\tan θ_1} \qquad \text{Eq. (3)}$$

$$D_3 = \frac{H_s - H_E}{\tan(θ_1 - θ_2)} \qquad \text{Eq. (4)}$$

$$D_2 = D_0 - D_1 - D_3 \qquad \text{Eq. (5)}$$

-continued $$Th = \frac{D_2}{V_0} \qquad \text{Eq. (6)}$$
$$= \frac{D_0 - D_1 - D_3}{V_0}$$
$$= \frac{V_0 * T_1 + V_0^2/2a + D_m - \frac{W_S}{\tan θ_1} - \frac{H_S - H_E}{\tan(θ_1 - θ_2)}}{V_0}$$

where Hs, height of traffic signal Sg (upper edge of light emitting portion) (m); HE, view point height (m); $V_0$, vehicle speed (m/s); $T_1$, braking start latency time (s); a, acceleration rate (m/s²); $D_m$, stop time margin (m); $θ_1$, looking-up angle of upper boundary line $BL_1$ (deg); $θ_2$, width viewing angle (deg); $W_S$, width of light emitting portion of traffic signal Sg; Th, time when light emitting portion of traffic signal Sg is completely hidden in upper boundary line $BL_1$ (hereinafter referred to as "completely hidden time") (sec).

The completely hidden time Th corresponding to the width viewing angle $θ_2$ is obtained for every view point height HE by substituting into the equation (6) $H_S$=6.4 m, $H_E$=1.0 to 2.5 m, $V_0$=60 km/h=16.667 m/s, $T_1$=1 s, a=5 m/s², $D_m$=10 m, $θ_1$=3.573° to 12.059°, $θ_2$=0.5° to 2.0°, and $W_S$=0.3 m.

FIG. 12 is a graph showing a relationship between the width viewing angle $θ_2$ and the completely hidden time Th for every view point height.

From the above calculation results, as shown in FIG. 12, if making the width viewing angle $θ_2$ not more than 1.8°, it is proved that the completely hidden time Th can be made to be not more than one second even in a case of the view point height $H_E$, 2.5 m. In addition, if making the width viewing angle $θ_2$ less than 0.5°, it becomes difficult to see the upper boundary line $BL_1$. Accordingly, the upper boundary line $BL_1$ is preferably provided so that the width viewing angle $θ_2$ is 0.5° to 1.8°.

Thus although the best modes for carrying out the present invention have been described in detail referring the drawings, the invention is not limited thereto and can be appropriately changed within the spirit and scope thereof.

For example, in the first and second embodiments, although the visible light transmissivity of the first area $A_1$ is not changed, the present invention is not limited thereto; by changing the transmissivity of the first area $A_1$ and thus forming the boundary B, the front window 2 may be separated. At this time, for example, if using the film $F_1$ used in the fourth embodiment, it is possible to eliminate a color aberration and to enhance driving safety.

Furthermore, in the first to fifth embodiments, although the cases have been described that the present invention is applied to a right-hand drive vehicle, the present invention is not limited thereto; it goes without saying that the invention may be applied to a left-hand drive vehicle. Furthermore, a kind of vehicle where the present invention will be applied is not specifically limited, and any vehicle such as a passenger car, a truck, and a bus is available.

Furthermore, although the first to fifth embodiments are configured so as to clearly indicate the boundary between each area, the present invention is not limited thereto; a color may also be gradated along a line where a looking-down angle is constant.

What is claimed is:

1. A vehicle comprising:
   a front window separated into a first area having a first light transmission characteristic and a second area provided below the first area, the second area having a second light transmission characteristic that is different from the first light transmission characteristic, wherein the first area meets the second area at a boundary shaped so that a looking-down angle from a driver is constant when the driver looks across the boundary, wherein a line connecting the driver's eyes to a road surface through the boundary extends above the hood of the vehicle.

2. The vehicle according to claim 1, wherein a boundary line is drawn to the boundary between the first area and the second area.

3. The vehicle according to claim 2, wherein a light transmission characteristic of the second area is different from that of the first area.

4. The vehicle according to claim 2, wherein the first area has a light transmission characteristic of attenuating light in a wavelength range of 380 nm to 470 nm by at least 60% and of transmitting light in a wavelength range of 510 nm to 780 nm by at least 70%; and the second area has a light transmission characteristic of attenuating light in a wavelength range of 520 nm to 570 nm by at least 50%.

5. The vehicle according to claim 2, wherein the first area and the second area are extended to side windows.

6. The vehicle according to claim 2, wherein the front window further comprises a third area above the first area separated therefrom.

7. The vehicle according to claim 6, wherein a boundary between the first area and the third area is provided so that an angle made by a line connecting driver's eyes to a center position in an up and down direction of the first area and another line connecting the driver's eyes to the boundary between the first area and the third area is 6° to 8°.

8. The vehicle according to claim 1, wherein the first area has a light transmission characteristic of attenuating light in a wavelength range of 380 nm to 470 nm by at least 60% and of transmitting light in a wavelength range of 510 nm to 780 nm by at least 70%; and the second area has a light transmission characteristic of attenuating light in a wavelength range of 520 nm to 570 nm by at least 50%.

9. The vehicle according to claim 1, wherein the first area and the second area are extended to side windows.

10. The vehicle according to claim 1, wherein the front window further comprises a third area above the first area separated therefrom.

11. The vehicle according to claim 10, wherein a boundary between the first area and the third area is provided so that an angle made by a line connecting driver's eyes to a center position in an up and down direction of the first area and another line connecting the driver's eyes to the boundary between the first area and the third area is 6° to 8°.

12. The vehicle according to claim 11, wherein the boundary line is drawn to the boundary between the first area and the third area.

13. The vehicle according to claim 11, wherein a light transmission characteristic of the third area is configured to differ from that of the first area.

14. The vehicle according to claim 11, wherein the third area has a light transmission characteristic of attenuating light in a wavelength range of 520 nm to 570 nm by at least 50%.

15. The vehicle according to claim 11, wherein the third area is extended to side windows.

16. The vehicle according to claim 10, wherein a boundary line is drawn to the boundary between the first area and the third area.

17. The vehicle according to claim 10, wherein a light transmission characteristic of the third area is configured to differ from that of the first area.

18. The vehicle according to claim 10, wherein the third area has a light transmission characteristic of attenuating light in a wavelength range of 520 nm to 570 nm by at least 50%.

19. The vehicle according to claim 10, wherein the third area is extended to side windows.

20. A vehicle comprising:

a front window separated into a first area having a first light transmission characteristic and a second area provided below the first area, the second area having a second light transmission characteristic that is different from a first light transmission characteristic, and a third area provided above the first area having a different light transmission characteristic from the first area, wherein the first area and second area meet at a boundary which is shaped so that, for each line connecting the driver's eyes to a point on a road-face through a point on the boundary, an angle between a driver's horizontal eye line and the line is constant, and a boundary between the first area and the third area has substantially a same shape as the boundary between the first area and the second area.

21. A vehicle comprising:

a front window separated into a first area having a first light transmission characteristic and a second area provided below the first area, the second area having a light transmission characteristic that is different from the first light transmission characteristic, the first area and the second area extending to side windows, wherein the first area and the second area meet at a boundary so that a looking-down angle from a driver is constant when the driver looks across the boundary.

* * * * *